United States Patent [19]

Shimura

[11] Patent Number: 4,997,334
[45] Date of Patent: Mar. 5, 1991

[54] APPARATUS FOR AUTOMATICALLY SUPPLYING LONG-CONTINUOUS BLANK

[75] Inventor: Fumihiko Shimura, Numazu, Japan

[73] Assignee: USUI Kokusai Sangyo Kaisha Ltd., Japan

[21] Appl. No.: 333,437

[22] Filed: Apr. 4, 1989

[30] Foreign Application Priority Data

Apr. 14, 1988 [JP] Japan ............................. 63-92342

[51] Int. Cl.⁵ ............................................ B65G 47/12
[52] U.S. Cl. ................................. 414/745.7; 198/441;
198/443; 198/550.5; 198/624; 198/803.14;
221/266
[58] Field of Search .................... 198/441, 443, 486.6,
198/481.1, 550.5, 624, 803.14; 221/277, 217,
265, 266; 414/745.7

[56] References Cited

U.S. PATENT DOCUMENTS

| 693,342 | 2/1902 | Warwick | 221/266 X |
| 3,151,747 | 10/1964 | McGoogan | 221/217 X |
| 4,116,597 | 9/1978 | Dunstan | 198/624 X |

FOREIGN PATENT DOCUMENTS 121777  5/1948  Sweden .................. 221/217

Primary Examiner—Robert J. Spar
Assistant Examiner—Janice Krizek
Attorney, Agent, or Firm—Anthony C. Casella; Gerald E. Hespos

[57] ABSTRACT

An apparatus for automatically supplying long-continuous blanks comprises a hopper formed with a front wall having a V-shaped cut-off, a rear wall and an open bottom portion; a disk provided at its circumferential portion with at least one notch to receive a single blank, the disk being rotatable with an angular rotation of 90 degrees; and rollers and drum rollers for transferring the single blank to a subsequent machining station. The apparatus may further be provided with a pusher for pushing up and down the blanks in the hopper and a sensor interlinked with the pusher for carrying out efficiently the feeding operation of the blanks.

11 Claims, 6 Drawing Sheets

APPARATUS FOR AUTOMATICALLY SUPPLYING LONG-CONTINUOUS BLANK

BACKGROUND OF THE INVENTION

1. Field of the Invention

The present invention relates to an apparatus for taking out a single long-continuous blank such as metal pipe or rod of a small diameter, from a bundle of long-continuous blanks stacked in a hopper and feeding it from its tip to a subsequent machining station such as a straightening device.

2. Description of Prior Art

It has been proposed to provide the apparatus for automatically taking out a single long-continuous blank from bundle of 50 to 100 long-continuous blanks (each having a diameter of less than about 20 mm ). The conventional apparatus have been used limitatively for taking out the single long-continuous blank from a bundle of long-continuous blanks. When used for taking out the single long-continuous blank from the bundle containing bent long-continuous blanks, it has been difficult to take out the single long-continuous blank, since the bent long-continuous blanks were a cause of entangling the blanks with one another in the bundle and such entanglement barred the single blank to be automatically taken out from the bundle.

In using the conventional apparatus for a bundle of long-continuous blanks each having a length of, for example, exceeding 7 m., the bundle of which containing the bent blanks, it is required to be attended by an operator to each apparatus to take out manually the single blank from the bundle when the entanglement of the blanks occurs and to always watch smooth operation of the apparatus for taking out the long-continuous blanks. In addition, the conventional apparatus require a manual operation for feeding the long-continuous blanks to the subsequent machining station.

SUMMARY OF THE INVENTION

In order to eliminate the above-mentioned disadvantages as occurs in the prior art the present invention is to provide an apparatus from automatically taking out a single long-continuous blank from a bundle of long-continuous blanks containing bent ones and feeding the single blank which was taken out to a subsequent machining device, the apparatus of which comprising a hopper formed with a front wall, a rear wall and an open bottom portion, the front wall of which having a V-shaped cut-off; a disk having at least one notch to receive a single long-continuous blank which is located at the lowest position of the V-shaped cut-off when a bundle of long-continuous blanks was dumped into a hopper in such a manner as to protrude the forward ends of the blanks from the V-shaped cut-off of the front wall, the disk of which rotating counter-clockwise or clockwise with an angular rotation of 90 degrees to move the single long-continuous blank fitted in the notch laterally; a plurality of rollers for gripping the thus moved blank to disengage it from the notch and transpose the same sideways; and a pair of upwardly and downwardly movable drum rollers for gripping the thus transposed blank to feed it to a subsequent machining station. The apparatus of the present invention may further be provided with a pushing rod for pushing up and down the bundle of long-continuous blanks to release the long-continuous blanks which are entangled with one another in the bundle so as to make a smooth feeding of the single blank to the notch of the disk and a sensor means to be interlinked with the pushing rod to sense the rotation of the disk without loading the single blank in the notch. Furthermore, according to the present invention the disk may be provided at its circumferential portion with four notches arranged at right angles with one another on the disk surface. In this case, the disk rotates only in one direction of the counter-clockwise and clockwise directions.

The operation of the apparatus for automatically supplying the long-continuous blanks according to the present invention shall be explained in the following.

When a bundle of the long-continuous blanks is dumped in the hopper in such a manner as to protrude the forward ends of the blanks from the V-shaped cut-off of the front wall, a single long-continuous blank which is located at the lowest portion of the V-shaped cut-off comes to fit in the notch of the disk. The disk is then rotated counter-clockwise or clockwise by substantially 90 degrees to move the single long-continuous blank along the rotating direction of the disk. The single blank thus moved is then gripped by the rollers and transposed sideways to be disengaged from the notch. The single blank thus transposed is subsequently gripped by a pair of upwardly and downwardly movable drum rolls which feed the single blank to a subsequent machining device. The pushing rod of a substantially T-shape is actuated to push up and down the bundle of long-continuous blanks in the hopper to release the entanglement of the blanks with one another, the entanglement of which being liable to occur by the bent long-continuous blanks contained in the bundle, so as to feed smoothly a single blank to the notch of the disk. The sensor means is interlinked with the pushing rod to sense the rotation of the disk without loading the single blank in the notch of the disk.

Thus, the long-continuous blanks can be automatically fed to the subsequent machining station one by one.

DETAILED DESCRIPTION OF THE PREFERRED EMOBIDMENTS

The present invention shall be described with reference to the accompanying drawings.

Figure 1:
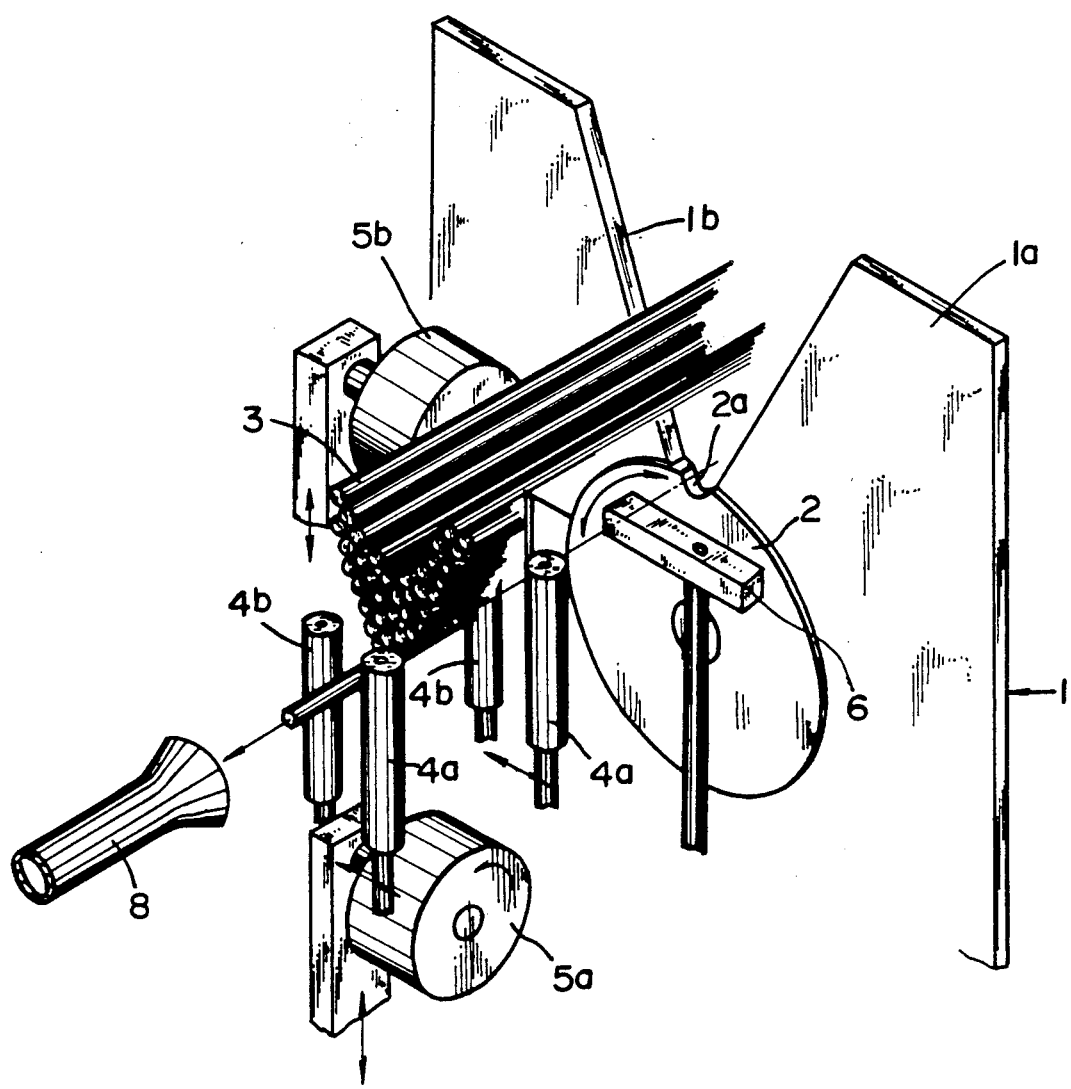
FIG. 1 is a perspective view of an apparatus for automatically supplying long-continuous blank, showing an embodiment of the present invention.

Referring now to FIG. 1, 1 denotes a hopper formed with a front wall 1a a rear wall (not shown) and an open bottom portion. The front wall 1a is provided with a V-shaped cut-off 1b and the rear wall is provided at its top portion with a recess. A flat lower part of the recess of the rear wall is at a position lower than the lowest part of the V-shaped cut-off 1b of the front wall 1a.

2 denotes a disk provided in the front of the cut-off 1b of the front wall 1a of the hopper 1. 3 denotes a bundle of long-continuous blanks, for example, thin metallic pipes having a diameter of less than 20 mm. The bundle of blanks 3 is dumped in the hopper 1 in such a manner as to protrude the forward ends thereof from the front wall.

The disk 2 rotates counter-clockwise or clockwise with an angular rotation of 90 degrees and is provided at its circumferential portion with a notch 2a which receives the forward end of a single long-continuous blank 3. Under the inoperative condition of the disk 2 the notch 2a is placed at a position where it is in register with the lowest portion of the V-shaped notch 1b of the front wall 1a.

4a and 4a' indicate moving rollers, each having a vertical rotating axis, which are reciprocatable laterally. 4b and 4b' indicate fixed rollers, each having also a vertical rotating axis, which are paired with the moving rollers 4a.

Figure 2:
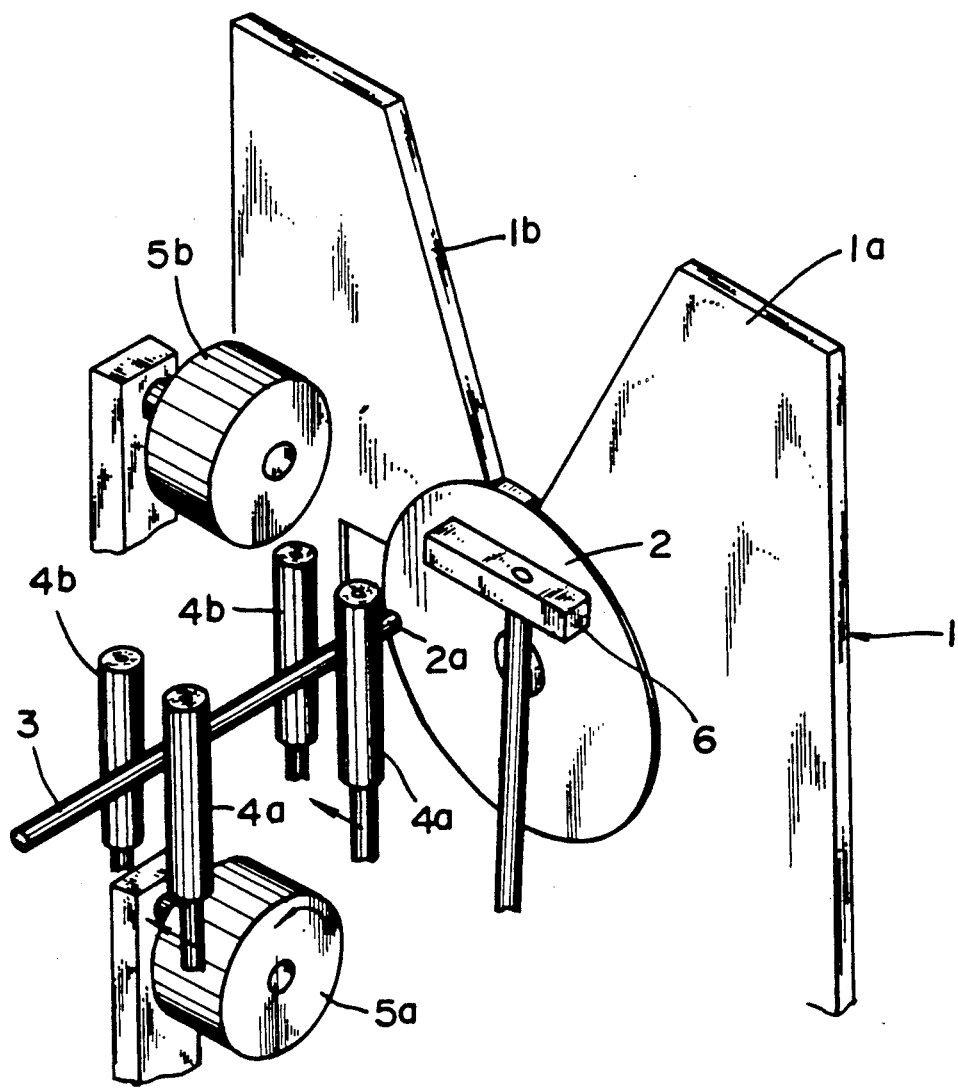
FIGS. 2 to 4 respectively illustrate the operation of the apparatus of FIG. 1.
Figure 3:
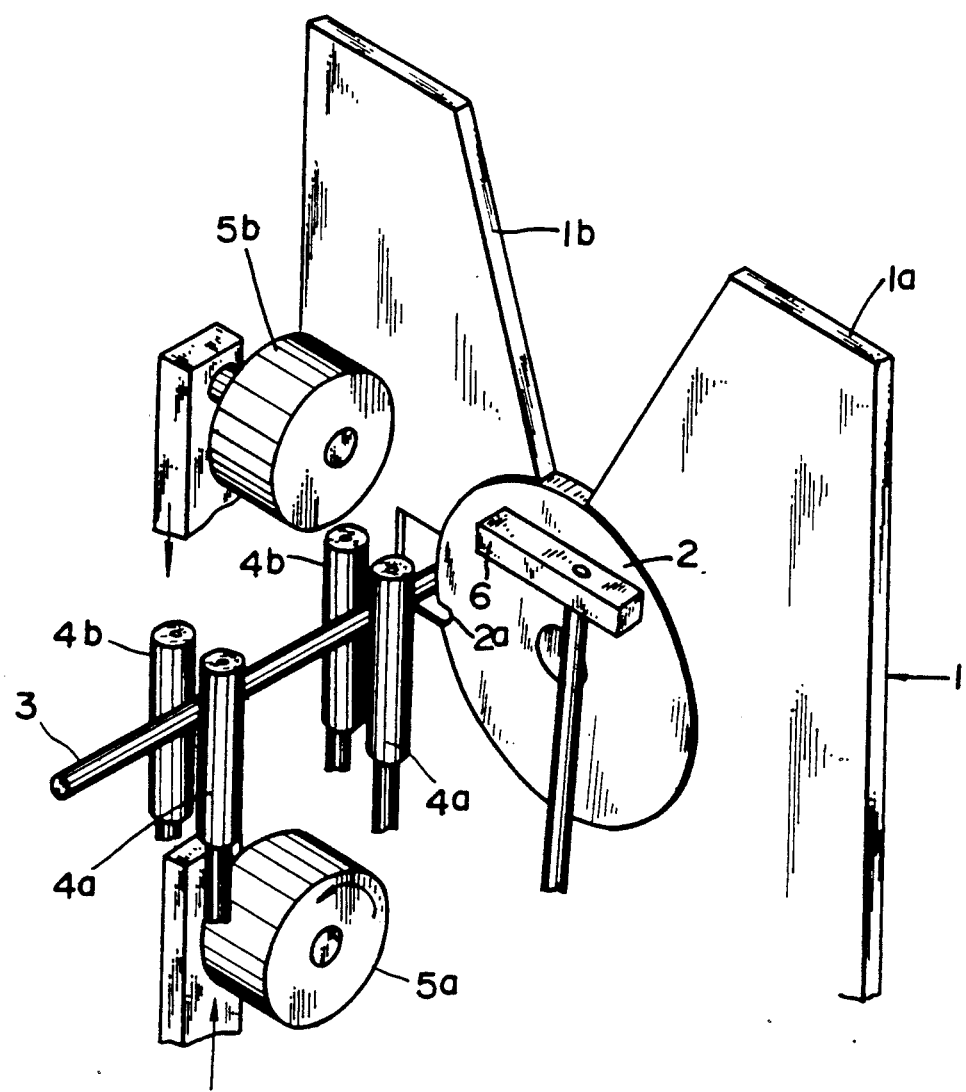

As shown in FIG. 2, when the disk 2 together with the single long-continuous blank 3 fitted in the notch 2a rotate counter-clockwise by 90 degrees, the moving rollers 4a and 4a' move towards the long-continuous blank 3 to contact it with the fixed rollers 4b and 4b' so as to disengage the long-continuous blank 3 from the notch 2a' and locate it in the range of the width of a pair of drum rollers 5a, 5b which are described in the following. (see FIG. 3). A pair of drum rollers consists of a driving drum roller 5a and a free drum roller 5b which has substantially the same width as of the driving drum roller 5a and is provided above and opposite the driving drum roller 5a.

Figure 4:
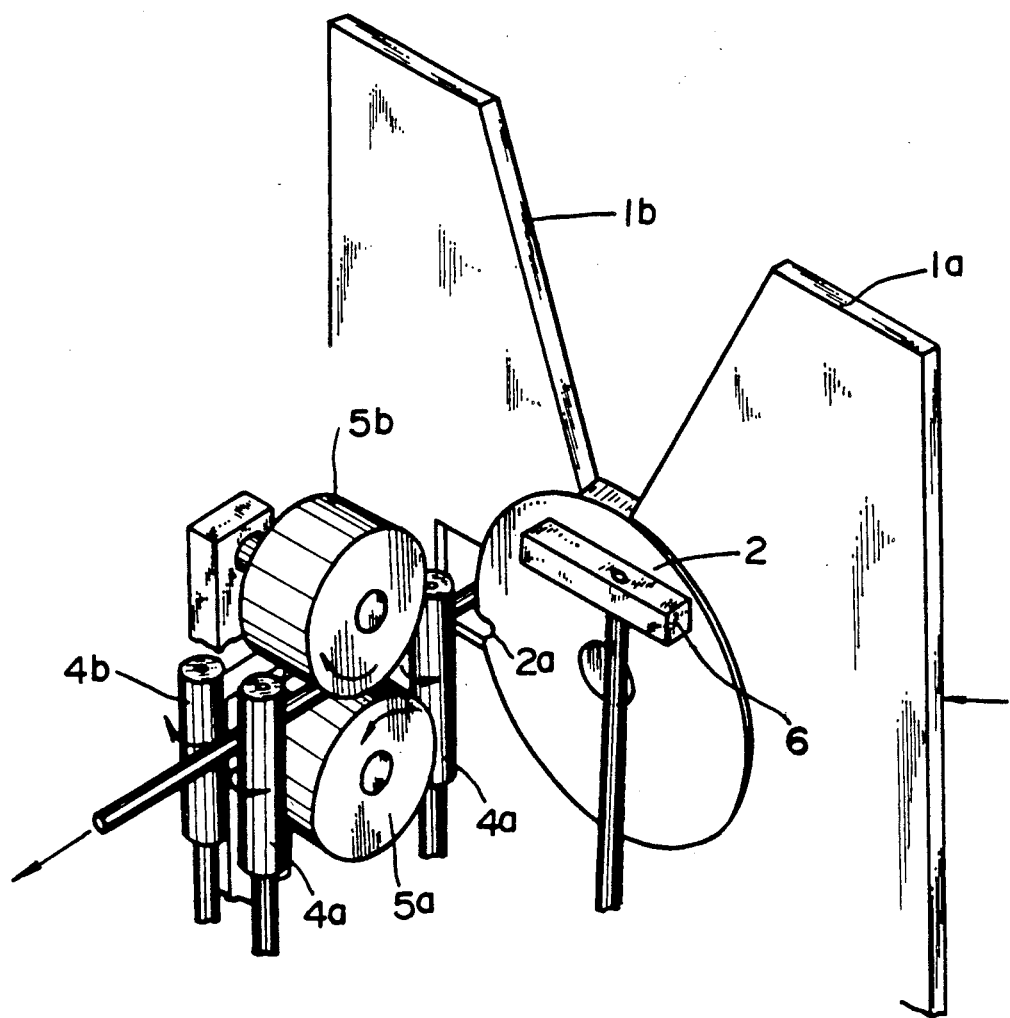

When the operation by the rollers 4a, 4a' and 4b, 4b' is finished, the free drum roller 5b descends simultaneously with ascending of the driving drum roller 5a to grip the long-continuous blank 3 therebetween to feed it to a subsequent machining device, as shown in FIG. 4.

Figure 6:
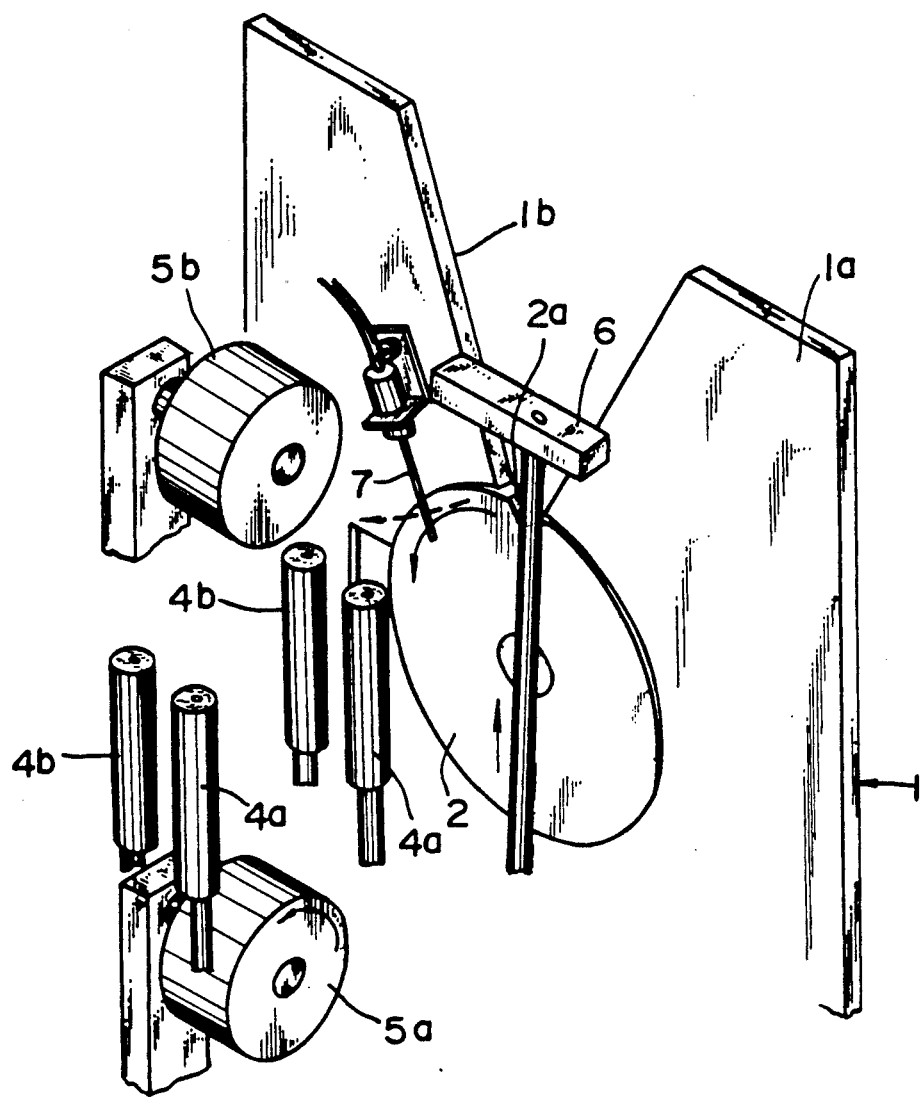

Referring now to FIG. 6, a pushing means and a sensor means shall be described. In the embodiment shown in FIG. 6, the pushing means is formed with a substantially T-shaped pushing rod 6 and the sensor means consists of, for example, a tactile probe 7 of a limit switch.

In case the bundle of long-continuous blanks contains blanks that are bent, there is liable to occur entanglement of the blanks with one another in the bundle. The entanglement of the blanks is often the cause of preventing the single long-continuous blank from being fitted in the notch of the disk, even if the bundle of long-continuous blanks is dumped in the hopper. In such case the disk rotates without loading the long-continuous blank in the notch. The T-shaped pushing rod 6 is provided to push up and down the bundle of long-continuous blanks in the hopper to release such entanglement of the blanks.

The tactile probe 7 may be provided, if necessary, to interlink with the pushing rod 6 so that it may sense whether or not the single long-continuous blank is fitted in the notch 2a of the disk 2 and, in the case of no blank being fitted, transmit a signal to the pushing rod to start pushing up and down the bundle of long-continuous blanks in the hopper 1, thereby preventing the disk 2 from being rotated without loading the blank in the notch 2a and providing an efficient feeding operation of the long-continuous blanks to the subsequent machining station. The foregoing descriptions are directed to the embodiment wherein the disk 2 is rotated substantially by 90 degrees and the rollers 4a, driving drum roll 5a and free drum roll 5b are provided on either side of the hopper 1.

Figure 5:
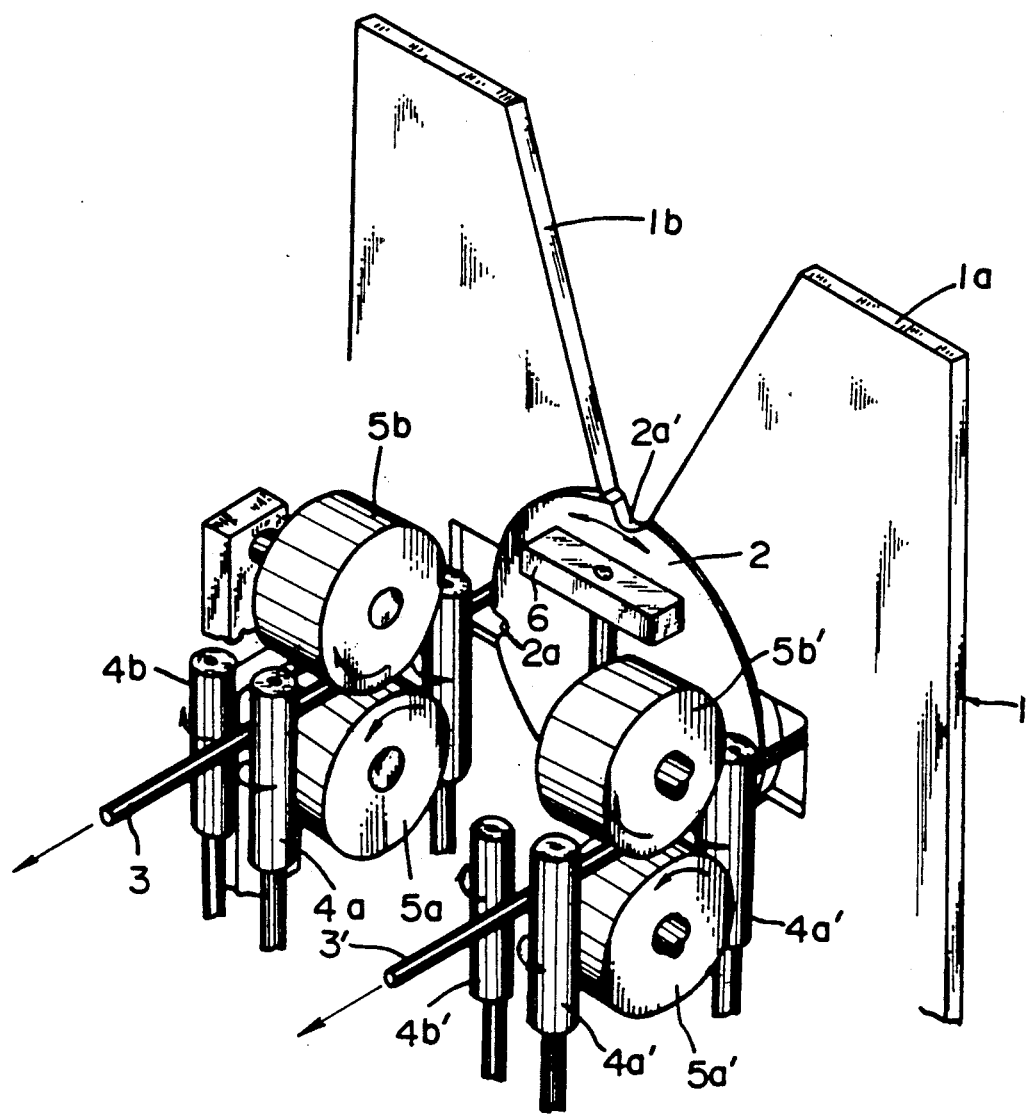
FIGS. 5 and 6 are respectively a perspective view showing a modified embodiment.

These rollers 4a and the driving drum roll 5a and free drum roll 5b may be arranged symmetrically on both sides of the hopper 1, more definitely, of a rotation axis of the disk 2, as shown in FIG. 5 in which, for clarification's sake, supporting poles for the rolls 5a and 5b are omitted.

Referring to FIG. 5, the disk 2 is provided at its circumferential portion with two notches 2a, 2a' arranged at right angles with each other on the disk surface, and the moving roller 4a and fixed roller 4b and the moving roller 4a' and fixed roller 4b' are symmetrical with respect to a rotating axis of the disk 2 and the driving drum roll 5a and free drum roll 5b' are also symmetrical with respect to the rotating axis of the disk 2. With the structure as shown in FIG. 5, the long-continuous blank 3 placed in the notch 2a of the disk 2 is transferred to the position as shown in FIG. 2 by counter-clockwise rotation of the disk 2 and, then, gripped by the rollers 4a, 4b and drum rollers 5a, 5b while disengaging from the notch 2a, is transferred to the subsequent machining station. At this time another notch 2a' of the disk 2 is at the position as shown in FIG. 1 to receive another long-continuous blank 3'. The another long-continuous blank 3' is transferred to the position as shown in FIG. 5 by clockwise rotation of the disk 2 and then gripped by the rollers 4a', 4b' and drum rollers 5a', 5b' while disengaging from the notch 2a' to be transferred to the subsequent machining station. Thereafter, the disk 2 is rotated counter-clockwise by 90 degrees to return the notch 2a' to the original position as shown in FIG. 5 so that a fresh long-continuous blank may be transferred by the notch 2a to the counter-clockwise position and the notch 2a' may be ready for receiving another fresh long-continuous blank.

Alternatively to the disk having two notches as shown in FIG. 5, the disk having a single notch 2a as shown in FIGS. 1-4 may be applied to such an arrangement of rollers as is shown in FIG. 5. In this case the long-continuous blank placed in the notch 2a can be moved by counter-clockwise or clockwise rotation of the disk through 180 degrees with angular rotation by 90 degrees so that the long-continuous blank may be efficiently transferred to the subsequent machining station, just like in the case of the disk having two notches.

For the sake of simplification of the drawings FIGS. 2 to 6 omit to show a guide 8, as shown in FIG. 1, having a trumpet-like inlet to facilitate the transfer of the long-continuous blank of the subsequent machining station.

Further alternatively to the disk having two notches as above mentioned, the disk 2 may be provided at its circumferential portion with four notches which are arranged at right angles with the adjacent ones on the disk surface. In this case the disk 2 may be rotated counter-clockwise or clockwise through 360 degrees.

The apparatus of the present invention can be used for the long-continuous blanks which are different from one another in the diameter, if the diameter of each blank is fittable to the dimension of the notch.

As will be understood from the foregoing description, the long-continuous blanks supplied into the hopper can be automatically and reliably drawn out and are fed to the subsequent machining device one by one, even if the long-continuous blanks are bent ones. In consequence, one operator may be able to operate a plurality of machines because it is not necessary for the machines to be always supervised by an operator.

What is claimed is:

1. An apparatus for automatically supplying long-continuous blanks comprising:
   a hopper having a V-shaped cut-off for receiving a plurality of the long-continuous blanks, said V- shaped cut-off including an opening at a lowest portion therein for enabling sequential feeding of the long-continuous blanks from the hopper;

pushing means periodically movable alternately upwardly and downwardly relative to the lowest portion of the V-shaped cut-off of the hopper for pushing on the long-continuous blanks in the hopper to release entanglement of the blanks and enable downward movement of the blanks in the hopper;

a disk with an outer circumference having a notch having a dimension to fittably receive a single long-continuous blank at the lowest location of the plurality of long-continuous blanks supplied into said hopper, said disk being rotatable with an angular rotation to transfer the single long-continuous blank;

a plurality of roller means for transposing the thus transferred single long-continuous blank radially outwardly relative to the outer circumference of the disk to disengage the blank from said notch; and a means for feeding the thus transposed single long-continuous blank by gripping the blank between two of the feeding means.

2. An apparatus according to claim 1, wherein said pushing means is formed with a substantially T-shaped pushing rod.

3. An apparatus according to claim 1, wherein said pushing means interlinks with a sensing means for sensing an idle rotation of said disk with no long-continuous blank loaded in the notch of said disk, said sensor means consisting of a tactile probe of a limit switch provided in the course of the rotating path of the long-continuous blank.

4. An apparatus according to claim 1, wherein said disk rotates in either a clockwise direction or a counter-clockwise direction with an angular rotation of 90 degrees starting from the bottom of said V-shaped cut-off.

5. An apparatus according to claim 1, wherein said disk rotates in both the clockwise direction and the counter-clockwise direction with an angular rotation of 90 degrees starting from the bottom of said V-shaped cut-off.

6. An apparatus according to claim 1, wherein said disk is provided along its circumferential portion with four notches equidistantly spaced around the periphery.

7. An apparatus according to claim 1, wherein said roller means includes at least two fixed driving rollers having a substantially vertical central axis, and at least two moving rollers having a substantially vertical central axis, said moving rollers being movable sideways.

8. An apparatus according to claim 1, wherein said means for feeding includes rollers having a substantially horizontal central axis, said rollers being movable up and down relative to each other.

9. An apparatus according to claim 1 wherein the pushing mean is disposed below the V-shaped cut-off of the hopper and is movable upwardly to push the blanks and thereby release entanglement.

10. An apparatus for automatically supplying long-continuous blanks comprising:
    a hopper having a V-shaped cut-off;
    a disk having a notch having a dimension to fittably receive a single long-continuous blank at the lowest location of a plurality of long-continuous blanks supplied into said hopper, said disk being rotatable with an angular rotation to transfer the single long-continuous blank;
    a plurality of roller means for transposing the thus transferred single long-continuous blank sideways to disengage the same from said notch, said roller means comprising at least two fixed drifing rollers having a substantially vertical central axis, and at least two moving rollers have a substantially vertical central axis, said moving rollers being movable sideways; and
    a means for feeding the thus transposed single long-continuous blank by gripping the blank between two portions of the feeding means.

11. An apparatus for automatically supplying long-continuous blanks comprising:
    a hopper having a V-shaped cut-off;
    a disk having a notch having a dimension to fittably receive a single long-continuous blank at the lowest location of a plurality of long-continuous blanks supplied into said hopper, said disk being rotatable with an angular rotation to transfer the single long-continuous blank;
    a plurality of roller means for transposing the thus transferred single long-continuous blank sideways to disengage the same from said notch; and
    a means for feeding the thus transposed single long-continuous blank by gripping the blank between two portions of the feeding means, said means for feeding comprising rollers having a substantially horizontal central axis, said rollers being movable up and down relative to each other.

* * * * *